United States Patent
Arai et al.

(10) Patent No.: US 7,923,659 B2
(45) Date of Patent: Apr. 12, 2011

(54) LASER MACHINING METHOD AND LASER MACHINING APPARATUS

(75) Inventors: Kunio Arai, Ebina (JP); Yasuhiko Kita, Ebina (JP); Yasushi Ito, Ebina (JP)

(73) Assignee: Hitachi Via Mechanics, Ltd., Ebina-shi (JP)

( * ) Notice: Subject to any disclaimer, the term of this patent is extended or adjusted under 35 U.S.C. 154(b) by 857 days.

(21) Appl. No.: 11/843,274

(22) Filed: Aug. 22, 2007

(65) Prior Publication Data

US 2008/0053974 A1    Mar. 6, 2008

(30) Foreign Application Priority Data

Aug. 31, 2006  (JP) ................. 2006-237033

(51) Int. Cl.
*B23K 26/06* (2006.01)
*B23K 26/073* (2006.01)
(52) U.S. Cl. ......... 219/121.73; 219/121.74; 219/121.83; 372/107
(58) Field of Classification Search ......... 219/121.63–121.77, 121.83; 372/107
See application file for complete search history.

(56) References Cited

U.S. PATENT DOCUMENTS

| | | | | |
|---|---|---|---|---|
| 5,159,172 A | * | 10/1992 | Goodman et al. | 219/121.68 |
| 5,251,055 A | * | 10/1993 | Koide | 359/216.1 |
| 5,362,956 A | * | 11/1994 | Anafi et al. | 250/201.9 |
| 5,490,133 A | * | 2/1996 | Nakamura et al. | 369/44.23 |
| 6,407,363 B2 | * | 6/2002 | Dunsky et al. | 219/121.71 |
| 6,605,796 B2 | * | 8/2003 | Brandinger et al. | 219/121.67 |
| 6,754,246 B2 | * | 6/2004 | Okada | 372/50.23 |
| 6,849,824 B2 | * | 2/2005 | Arai et al. | 219/121.7 |
| 6,875,951 B2 | * | 4/2005 | Sakamoto et al. | 219/121.73 |
| 7,098,871 B1 | * | 8/2006 | Tegreene et al. | 345/7 |
| 2005/0247682 A1 | * | 11/2005 | Kuroiwa et al. | 219/121.73 |

FOREIGN PATENT DOCUMENTS

| | | | |
|---|---|---|---|
| JP | 63147138 | * | 6/1899 |
| JP | 2004249364 | * | 9/2004 |

* cited by examiner

*Primary Examiner* — Samuel M Heinrich
(74) *Attorney, Agent, or Firm* — Crowell & Moring LLP (57) ABSTRACT

A laser machining method and a laser machining apparatus by which holes excelling in form accuracy can be machined efficiently are to be provided. A first cylindrical lens and/or a second cylindrical lens to correct any deformation of reflective face of a first mirror and/or a second mirror is arranged on an optical axis of a laser beam, and converging positions of the laser beam for an X-component and for a Y-component are coincident with a point on the optical axis.

3 Claims, 7 Drawing Sheets

|    | A    | B    | C    | D    |
|----|------|------|------|------|
| 2a | 0.13 | 0.09 | 0.13 | 0.09 |
| 2b | 0.10 | 0.12 | 0.10 | 0.12 |
| 1a | 0.18 | 0.15 | 0.15 | 0.25 |
| 1b | 0.20 | 0.20 | 0.18 | 0.20 |

FIG. 5B

|    | A    | B    | C    | D    |
|----|------|------|------|------|
| 2a | 0.13 | 0.06 | 0.13 | 0.06 |
| 2b | 0.10 | 0.29 | 0.10 | 0.29 |
| 1a | 0.12 | 0.18 | 0.12 | 0.15 |
| 1b | 0.15 | 0.25 | 0.14 | 0.25 |

FIG. 5C

|    | A     | B    | C     | D     |
|----|-------|------|-------|-------|
| 2a | -0.35 | 0.10 | -0.35 | -0.05 |
| 2b | 0.06  | 0.06 | 0.05  | 0.07  |
| 1a | 0.33  | 0.17 | 0.28  | 0.22  |
| 1b | 0.07  | 0.05 | 0.10  | 0.05  |

FIG. 5D

|    | A    | B    | C    | D    |
|----|------|------|------|------|
| 2a | 0.08 | 0.13 | 0.08 | 0.09 |
| 2b | 0.05 | 0.03 | 0.09 | 0.04 |
| 1a | 0.10 | 0.12 | 0.10 | 0.14 |
| 1b | 0.18 | 0.20 | 0.22 | 0.20 |

FIG. 6

RELATED ART

LASER MACHINING METHOD AND LASER MACHINING APPARATUS

BACKGROUND OF THE INVENTION

The present invention relates to a laser machining method and a laser machining apparatus by which a laser beam is positioned by two mirrors whose axes of rotation are arranged in a transverse manner and made to enter a converging lens, and a work is machined with converged (focused) laser beam.

Figure 6:
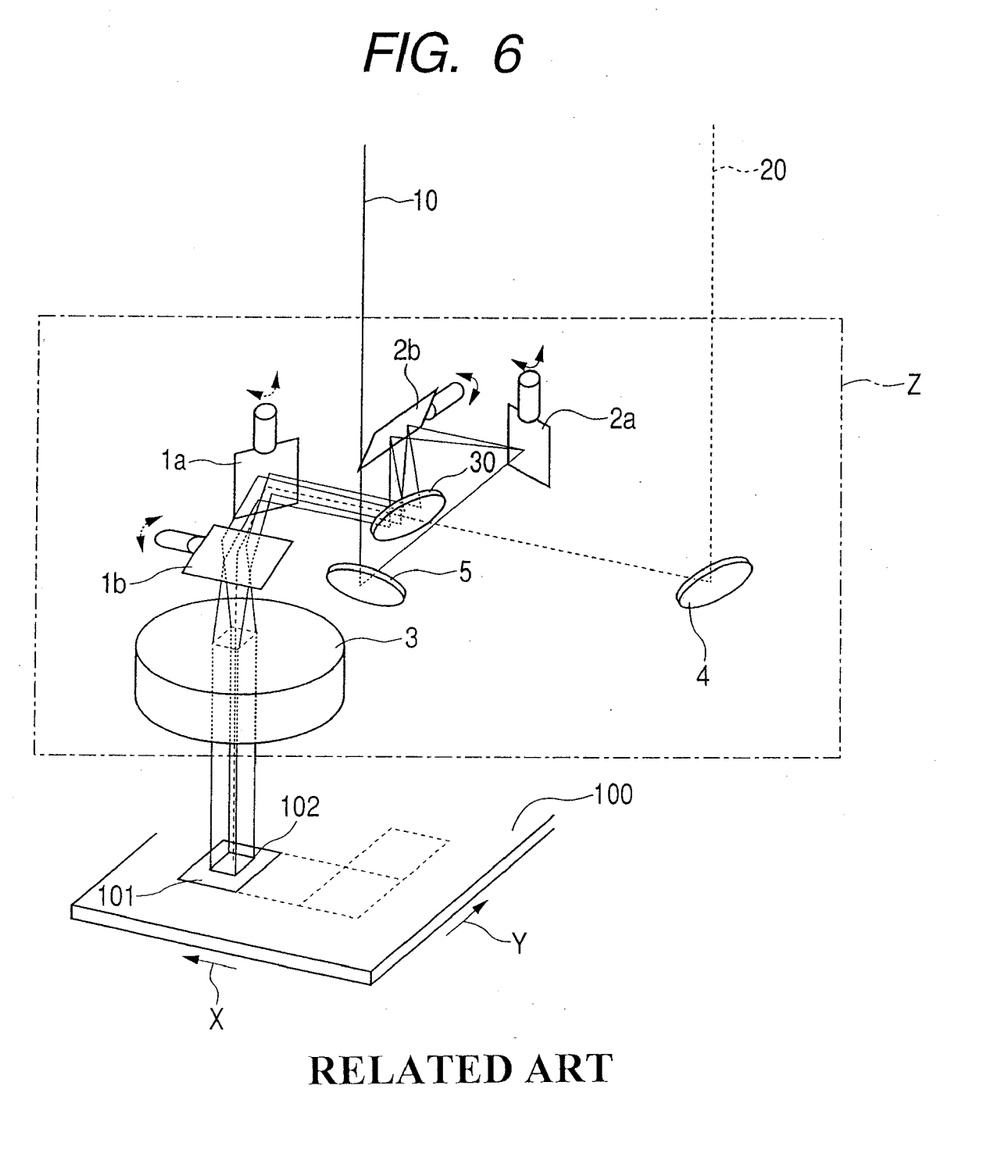
FIG. 6 shows the optical system of the head unit in a conventional laser machining device.

FIG. 6 shows the optical system of the head unit in a conventional laser machining device.

A first laser beam 20, which is a P-polarized beam, output from a laser oscillator (not shown) is reflected from a fixed mirror 4 through a polarized beam mixer 30, and then from a mirror 1a (X mirror) and a mirror 1b (Y mirror) through an fθ lens 3 onto a printed circuit board 100. A second laser beam 10, which is an S-polarized beam, output from another laser oscillator (not shown) after being reflected by a fixed mirror 5 and further reflected by mirrors 2a and 2b, is reflected by the polarized beam mixer 30 and then reflected from the mirrors 1a and 1b through the fθ lens 3 onto the printed circuit board 100. The machining range of the first laser beam 20 is an area 101 and that of the second laser beam 10 is an area 102. The mirrors 1a and 1b, the fixed mirrors 4 and 5, the mirrors 2a and 2b, the polarized beam mixer 30 and the fθ lens 3 are arranged in a head unit Z indicated by surrounding in the drawing by one-dot chain lines (Patent Document 1).

Next, the mirrors 1a and 1b will be described in more detail.

Figures 7A, 7B:
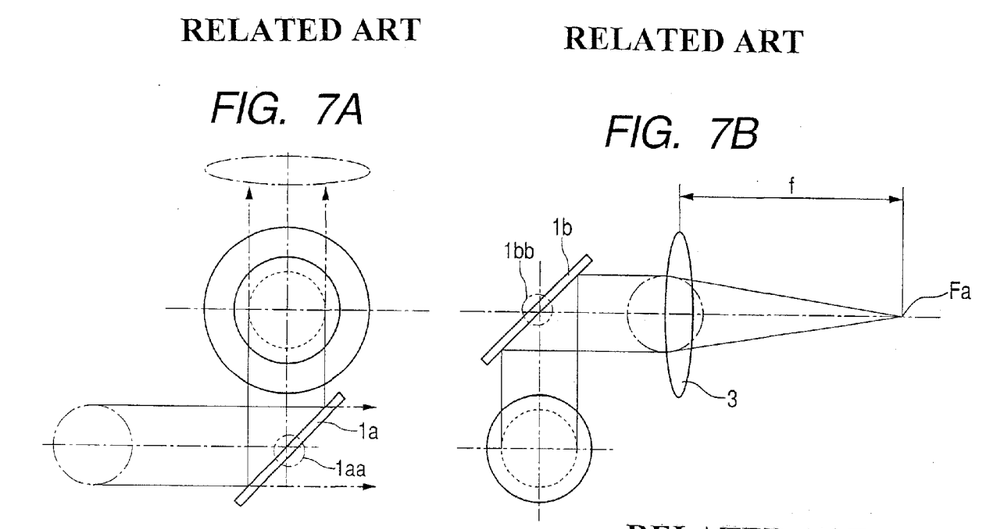
FIGS. 7A to 7C illustrate an example of pertinent related art.
Figure 7C:
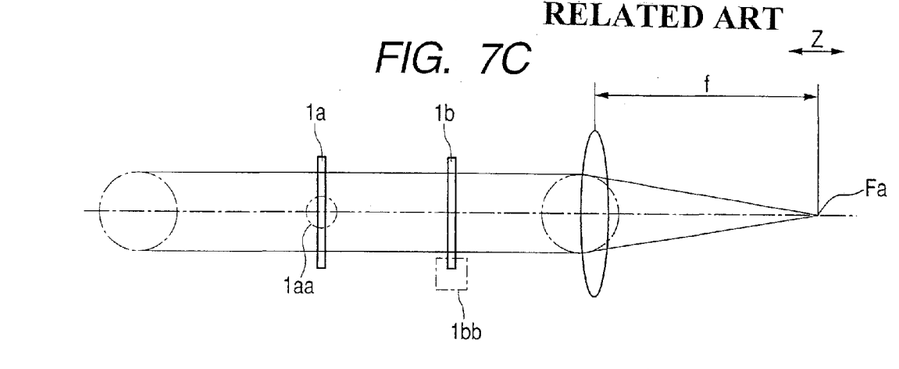

FIGS. 7A to 7C show the relationship between the mirrors 1a and 1b and the fθ lens 3 wherein 7A is a top view of the optical system of the machining unit; 7B is a right side view of 7A; and 7C is a unfolded optical diagram in the proceeding direction of the laser beam (the direction indicated by a one-dot chain line).

If the reflective faces of the mirrors 1a and 1b are flat, the laser beam 20 whose section is round, for instance, converges to a focal position Fa (Fa is the designed focal position) of the fθ lens 3 whose focal length is f. Here, in FIGS. 7A to 7C, 1aa denotes the rotation axis of an actuator which rotates the mirror 1a and 1bb donates the rotation axis of an actuator which rotates the mirror 1b.

Incidentally, though the diameter (spot diameter) of the laser beam 20 before and after the converging position Fa (the Z direction here) is greater than the spot diameter in the converging position Fa, the circularity of the beam is secured. For instance, where the beam diameter suitable for machining a hole of the 50 μm in diameter is 30 mm, circularity of 95% or more is achieved in a range of about ±50 μm with reference to the focal position Fa.

In this laser machining device, since a positioning range 102 determined by the second set of mirrors (the mirrors 2a and 2b) can be substantially overlapped with a positioning range 101 determined by the first set of mirrors (the mirrors 1a and 1b), the efficiency of machining can be enhanced by positioning the first laser beam 20 and the second laser beam 10 (see Patent Document 1).

Patent Document 1: JP-A-249364/2004

SUMMARY OF THE INVENTION

The frequency at which the laser oscillator generates a laser beam is sufficiently higher than the positioning frequencies of the mirrors 1a, 1b, 2a and 2b (hereinafter collectively referred to as "mirrors A" unless there is particular need for discrimination). Therefore, if the mirrors A can be positioned at high speed, the efficiency of machining can be enhanced. In order to position the mirrors A at high speed, it is effective to reduce the mass of the mirrors A.

Since it is effective, in order to machine small bore holes, to increase the outer diameter of the laser beam as is well known, it is not acceptable to reduce the size of the mirrors A. Therefore, in order to reduce the mass of the mirrors A, the material thickness of the mirrors A should be thinned.

However, reducing the thickness of the mirrors A might produce bending, distortion or deformation in some other way of the reflective faces by distortion during machining and polishing (surface finishing). Also, even if the reflective face of each individual one of the mirror A is flat, if the mirrors A are caused to be supported by actuators by adhesive or otherwise, the reflective faces may be deformed sometimes. Deformed reflective faces would cause not only, for instance, the deviation of focal positions in the X-direction and the Y-direction toward the direction of the optical axis and thereby deterioration in the circularity of the hole, but also uneven energy deterioration through the deterioration of the beam mode, resulting in poor hole quality.

Reducing the mass of the mirrors A in pursuit of the efficiency of machining causes a poor geometry of hole that is machined. Increasing the plate thickness of the mirrors A for greater form accuracy of the hole results in an increased mass of the mirrors A, generating a fall in the efficiency of machining.

An object of the present invention is to solve the problems noted above, and to provide a laser machining method and a laser machining apparatus which permit efficient machining of holes excelling in form accuracy.

In order to solve the problems noted above, the invention in its first aspect provides a laser machining method by which a laser beam is positioned by an X mirror whose axis of rotation is in an X-direction and a Y mirror whose axis of rotation is in a Y-direction and made to enter a converging lens, and a work is machined with converged (focused) laser beam, wherein an optical device for correcting curvature of reflective face of the X mirror or the Y mirror is provided; the optical device is arranged on an optical axis of the laser beam; and converging positions of the laser beam in the X-direction and in the Y-direction are coincident with a point on the optical axis.

The invention in its second aspect provides a laser machining apparatus provided with an X mirror whose axis of rotation is in an X-direction, a Y mirror whose axis of rotation is in a Y-direction and a converging lens, a laser beam being positioned by the X mirror and the Y mirror and made to enter the converging lens, and a work being machined with converged (focused) laser beam, wherein an optical device for correcting curvature of reflective face of the X mirror or the Y mirror is provided, and the optical device is arranged on an optical axis of the laser beam; and converging positions of the laser beam in the X-direction and in the Y-direction are coincident with a point on the optical axis.

According to the invention, since any distortion occurring on the mirrors A can be optically eliminated, holes excelling in form accuracy can be machined efficiently.

DETAILED DESCRIPTION OF THE PREFERRED EMBODIMENTS

Preferred embodiments of the present invention will be described below with reference to accompanying drawings.

Embodiment 1

First, a case in which the reflective faces of the mirrors A are warped substantially concavely or convexly about the rotation axis, which deformation occurs most frequently on the mirrors A, will be described. It is supposed here that the mirrors A include only one mirror 1a and one mirror 1b.

Figure 1A:
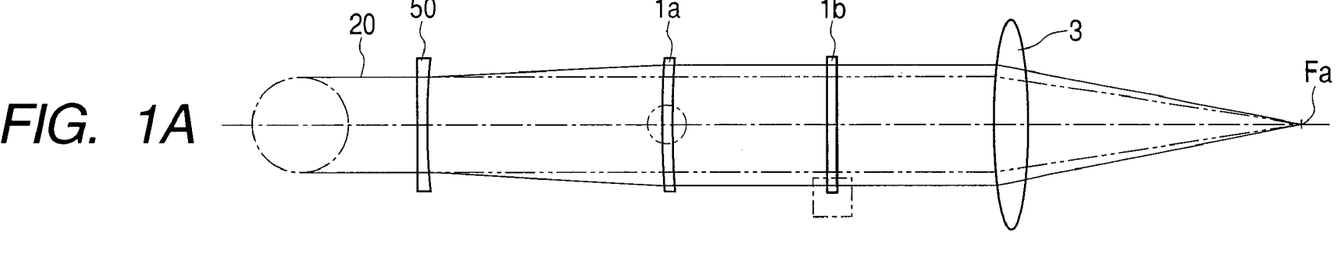
FIGS. 1A to 1C show unfolded diagrams of the optical system of a machining unit according to the invention.
Figure 1B:
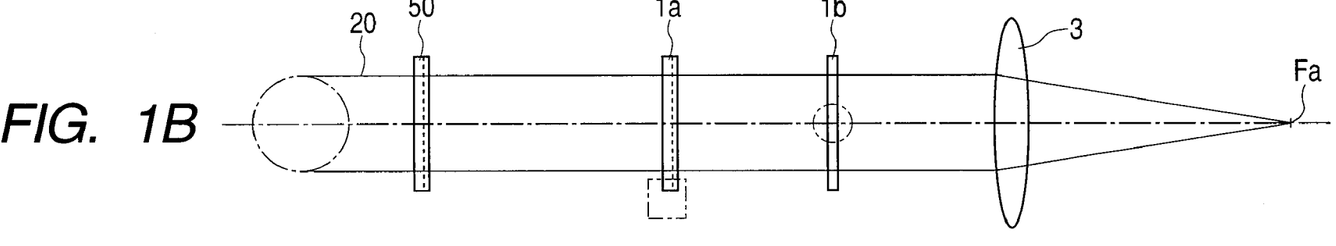
Figure 1C:
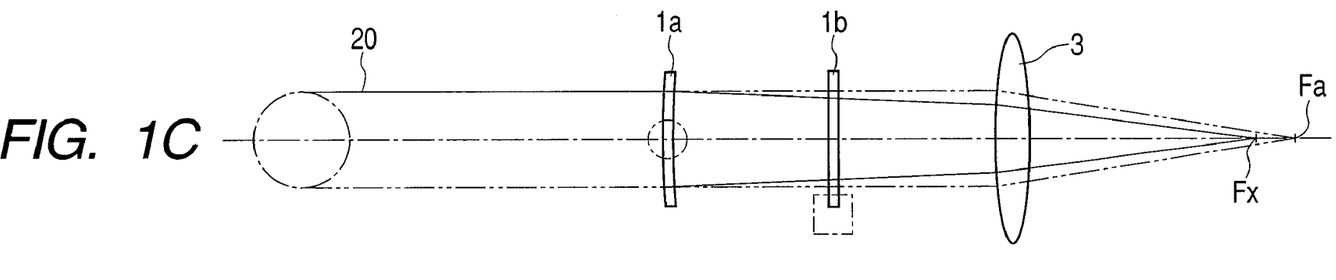
Figure 2:
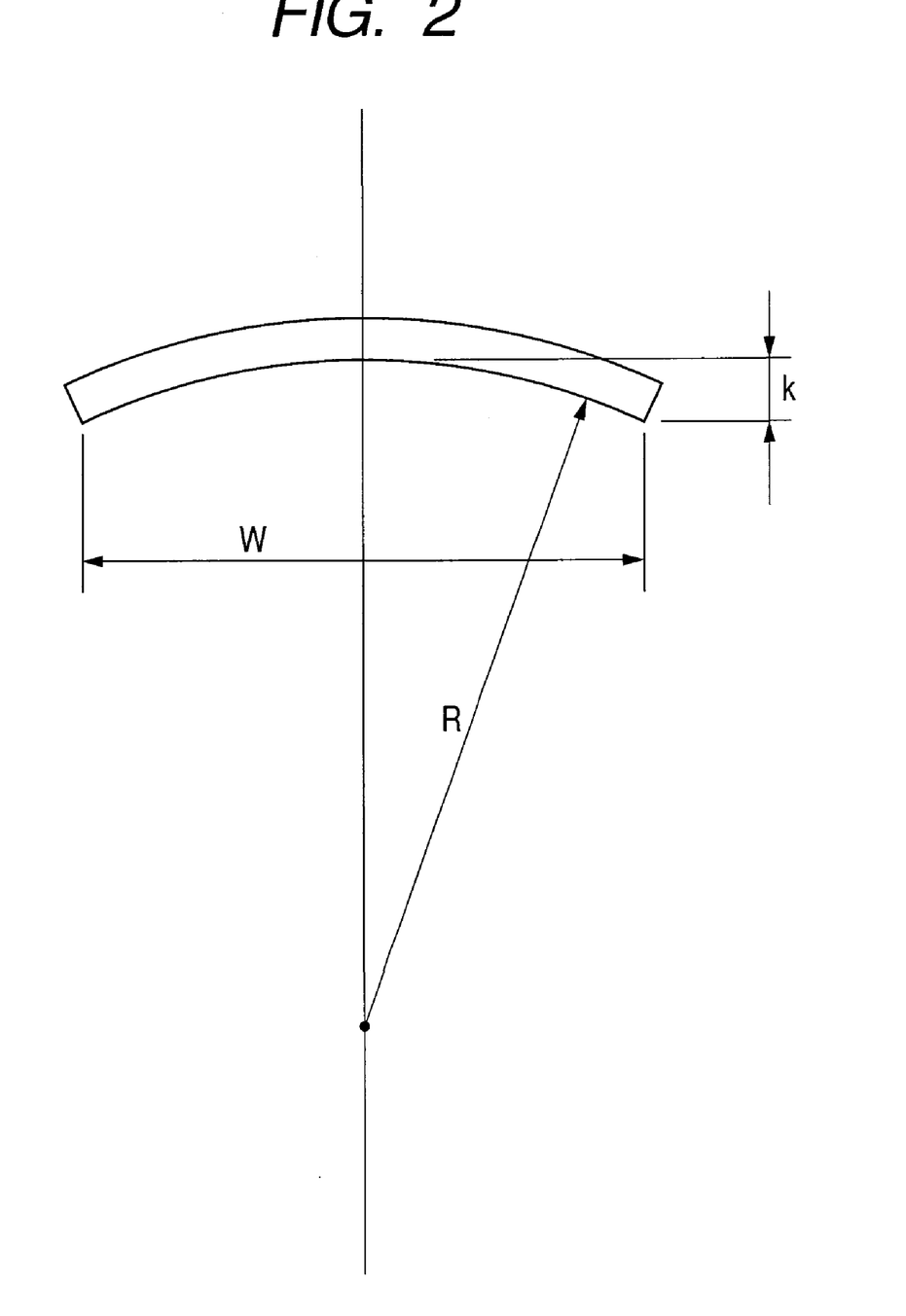
FIG. 2 illustrates how the mirrors A are deformed.

FIGS. 1A to 1C show unfolded diagrams of the optical system of a machining unit according to the invention, wherein 1A shows an X-directional component (hereinafter referred to as an X-component) of the laser beam; 1B shows a Y-directional component (hereinafter referred to as a Y-component) of the laser beam; and 1C shows the X-component of the laser beam according to the related art. FIG. 2 illustrates how the mirrors A are deformed.

A width w of the mirrors A here is defined as a width of projections onto a perpendicular plane to the laser beam, which is slightly larger than a maximum diameter d of the laser beam. Thus, where the maximum diameter d of the laser beam is 30 mm for instance, it is sufficient for the width w of the mirrors A to be at least 31 mm. In the embodiment described below, d=30 and w=31 are supposed.

Where a reflective face of a mirror A is warped to form a concave cylindrical surface as shown in FIG. 2, a radius (curvature) R of this concave can be represented by Equation 2 wherein k is the extent of deformation (after a correction of projection).

$$R^2=(R-k)^2+(w/2)^2 \quad \text{(Equation 1)}$$

Here, k is small enough to permit the term of $k^2$ to be ignored. Hence, $$R=w^2/8k \quad \text{(Equation 2)}$$

Where k=0.5 μm for instance, R is approximately 240 m according to Equation 2.

In the example of FIGS. 1A to 1C, a reflective face of a mirror 1a is a concave having a curvature of R, and a reflective face of a mirror 1b is flat. In this case, a concave cylindrical lens 50 is arranged on an optical path of the laser beam 20. As shown in FIG. 1B, irrespective of the presence or absence of the cylindrical lens 50, the Y-component of the laser beam 20 is converged to a designed focal position Fa. On the other hand, the X-component of the laser beam 20 is modified into a divergent beam by the cylindrical lens 50 as indicated by solid lines in FIG. 1A and reflected into a parallel beam by the mirror 1a, and converged to the designed focal position Fa as is the Y-component.

Here, if no cylindrical lens 50 is provided, as the X-component of the laser beam 20 is converged to a focal position Fx closer than the focal position Fa to a fθ lens 3 as indicated by solid lines in FIG. 1C. Therefore, not only circularity of the hole is impaired but also energy distribution becomes less uniform, causing deterioration in hole quality.

A focal distance of the cylindrical lens 50 being represented by fs here, what can correct the X-component of the laser beam 20 is a cylindrical lens of fs≈R/2. Therefore, by measuring in advance the deformation of the reflective face of the mirror 1a and figuring out the curvature R of the reflective face, the focal position fs of the cylindrical lens 50 can be determined.

Incidentally, where the reflective faces of the mirrors A are convex (the curvature is −R), obviously the convex cylindrical lens 50 of fs=−R/2 is the right choice.

Next, a case in which the reflective faces of the mirror 1a and the mirror 1b are curved will be described.

In this case, the following two alternatives are available.

(1) First method: A cylindrical lens 50a for canceling the deformation of the mirror 1a and a cylindrical lens 50b for canceling the deformation of the mirror 1b are provided. As the deformations of both mirrors 1a and 1b are corrected in this case, the laser beam 10 can be converged to the focal position Fa.

(2) Second method: Only the cylindrical lens 50a for canceling the deformation of the mirror 1a is provided. Namely, the cylindrical lens 50b for canceling the deformation of the mirror 1b is not provided. Since the deformation of the mirror 1b is not corrected in this case, the Y-component of the laser beam 20 is converged to a position Fy deviating from the focus f. Therefore, the focal distance fs of the cylindrical lens 50a is so selected as to enable the X-component of the laser beam 20 to be converged to the position Fy. Where the curvature of the mirror 1b is N and that of the mirror 1a is M for instance, the focal distance fs of the cylindrical lens 50 will be determined as follows:

$$fs=(M-N)/2$$

In this case, where the beam diameter is 30 mm, which is a suitable diameter for machining a hole of 50 μm in diameter, the possible defocused range in which the circularity can be 95% or more is narrowed to about ±40 μm with reference to the position Fy (50 μm for the focal position Fa), but this scarcely causes a practical problem.

Incidentally, where the mirrors A include only the mirror 1a and the mirror 1b, the cylindrical lenses 50a and 50b may be arranged in any positions between the machining point and the laser oscillator, but arranging them between the laser oscillator and the fθ lens 3 would prove useful in practice.

Next, a case in which there are four mirrors A of the mirrors 1a and 1b and the mirrors 2a and 2b will be described.

Embodiment 2

Figure 3:
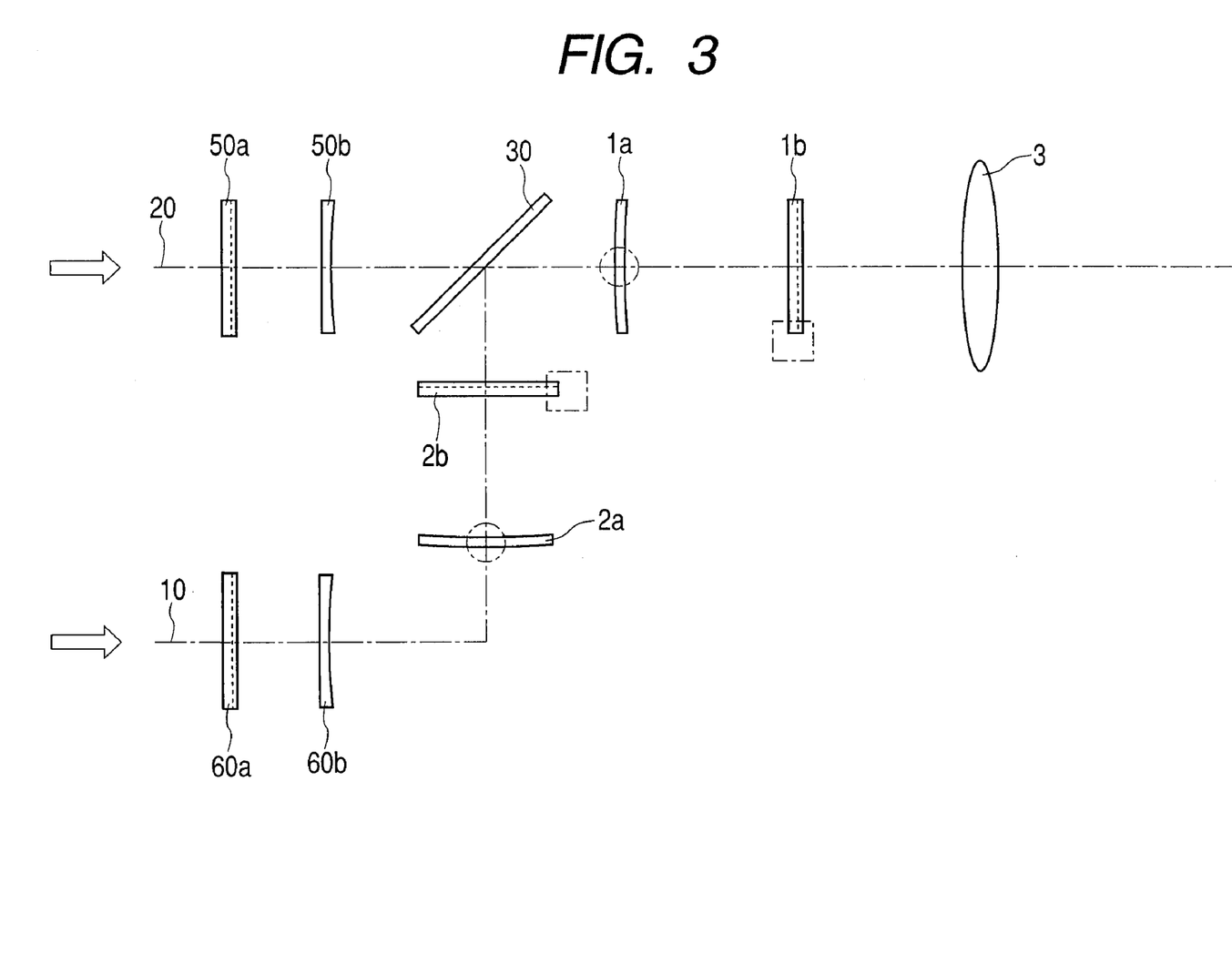
FIG. 3 shows a unfolded diagram of the optical system of another machining unit according to the invention.

FIG. 3 shows a unfolded diagram of the optical system of another machining unit, focusing on the relationship between the mirrors 1a, 1b, 2a and 2b and the fθ lens 3.

In the illustrated case, while the first laser beam comes incident on the fθ lens 3 via the mirrors 1a and 1b, the second laser beam, after being reflected by the mirrors 2a and 2b, further comes incident on the fθ lens 3 via the mirrors 1a and 1b.

In this case, regarding the first laser beam 20, deformations of the mirrors 1a and 1b can be corrected by the method with respect to Embodiment 1 above. Arrangement of the cylindrical lenses 50a and 50b between the polarized beam mixer 30 and the laser oscillator as shown in FIG. 3 is useful in practice because the second laser beam 10 can be kept unaffected.

On the other hand, a cylindrical lens of a focal distance that can cancel the deformations of the mirror 1a and the mirror 2a can be selected as a cylindrical lens 60a to correct the X-component of the second laser beam 10, and a cylindrical lens of a focal distance that can cancel the deformations of the mirror 1b and the mirror 2b can be selected as a cylindrical lens 60b to correct the Y-component.

To add, where both of the mirrors 1a and 1b are deformed, it is also possible to arrange the cylindrical lens 50a which corrects the deformation of only the mirror 1a and to align the X-component with the focal position Fy of the Y-component by using this cylindrical lens 50a. In this case, a cylindrical lens whose focal distance can cancel the deformation of the mirror 2b can be used as the cylindrical lens 60b which corrects the Y-component of the second laser beam 10. Also, a cylindrical lens which represents consideration for the deformation of the mirror 2a and that of the mirror 1a and converges the X-component of the second laser beam 10 to the focal position Fy can be used as the cylindrical lens 60a which corrects the X-component of the second laser beam 10.

Incidentally, if a cylindrical lens to cancel the deformation of the reflective face is provided for each individual mirror A, the laser beam 10 and the laser beam 20 can be converged to the focal position Fa, but this entails a complex structure. An arrangement of cylindrical lenses for use where the individual deformations of the mirrors A are not so substantial will be described below.

Embodiment 3

Figure 4:
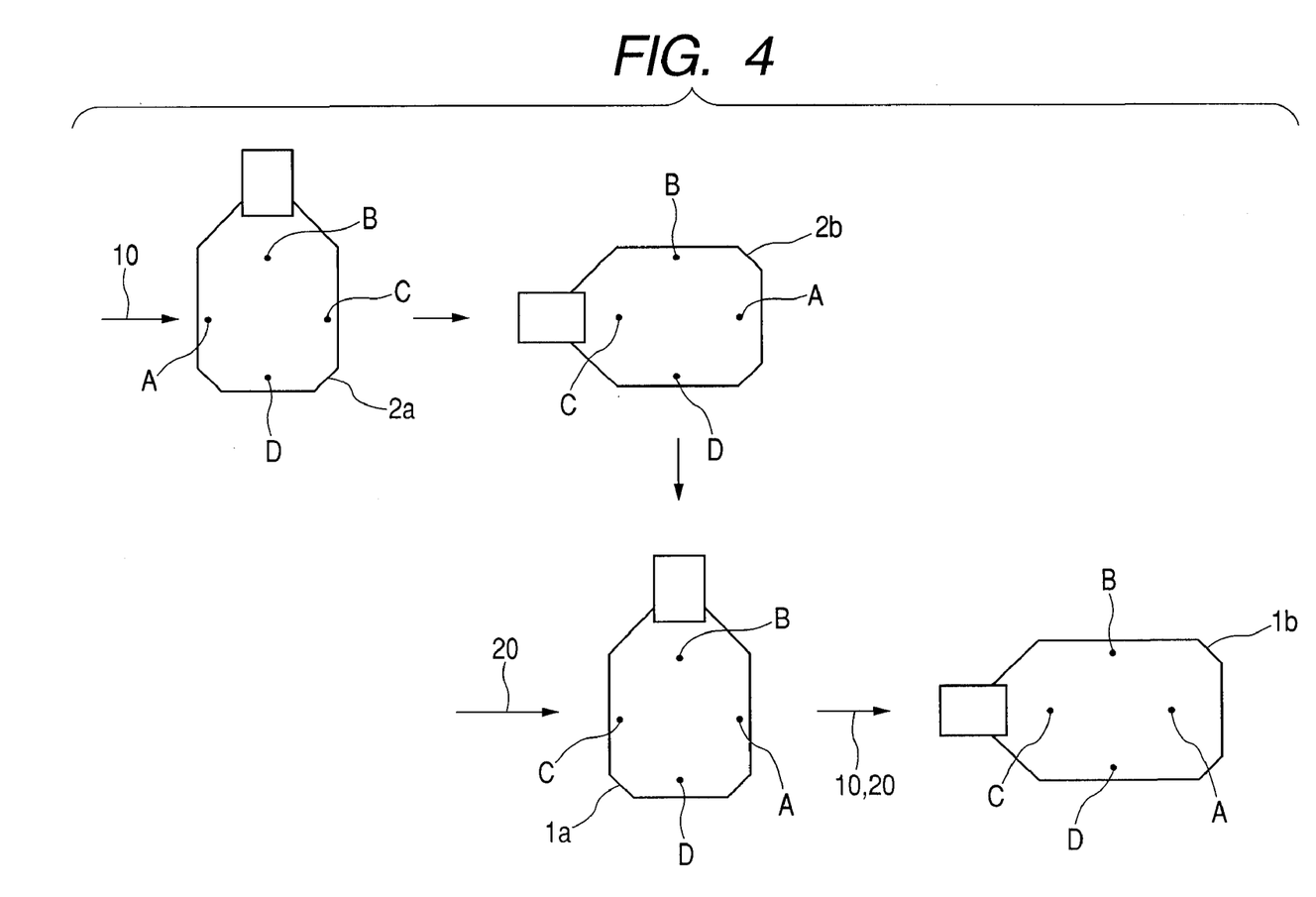
FIG. 4 is a schematic diagram showing a relationship between the reflective faces of the mirrors A in FIG. 3.

FIG. 4 is a schematic diagram showing a relationship between the reflective faces of the mirrors A in FIG. 3.

As shown in FIG. 4, if X and Y are determined with reference to the position of the laser beam 20 coming incident on the mirror 1a, the beam coming incident at A through D on the mirror 1a comes incident on the mirror 1b at A through D. Thus, A through D of the mirror 1b are in positions corresponding to 90° rotations of A through D, respectively, of the mirror 1a. The second laser beam passes A through D of the mirrors 2a and 2b as indicated in the diagram. Here, A through D are positions 15 mm away from the centers of the respective reflective faces for the X- and Y-components.

FIGS. 5A through 5D are tables of measured deformations of the reflective faces, which are deformations in μm of the positions of A through D in each mirror measured from a virtual perfect plane for the mirror passing through the center.

The procedure of determining the focal distance of a cylindrical lens will be described below with reference to the case of FIG. 5A.

Figure 5A:
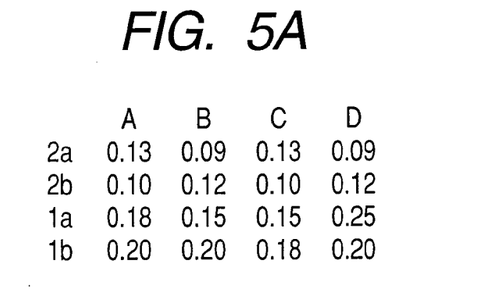
FIGS. 5A to 5D are tables of measured deformations of the reflective faces.

In the case of FIG. 5A, first a deformation extent k is calculated from Equation 3, and the obtained k is substituted into Equation 2 to calculate the curvature Rt in this case. Then, the focal distance fs is determined to be equal to Rt/2.

$$k = \text{Avg}(\Sigma A, \Sigma C) - \text{Avg}(\Sigma B, \Sigma D) \quad \text{(Equation 3)}$$

where Avg is the average, ΣA~ΣD are the sums for the positions, respectively.

Equation 3 is a formula to calculate the difference between the sum of deformation extents for the X-component and the sum of deformation extents for the Y-component. Then, by arranging a cylindrical lens of the determined focal distance between the polarized beam mixer 30 and the mirror 2b, the variations in converging positions of the laser beams 10 and 20 in the X- and Y-components can be kept to around 10 μm.

When the deformations of the mirrors A were measured in advance and a machining test was done, it was found that no particular correction of deformations was needed when the deformation extents calculated from Equation 3 were not more than 0.1 μm.

Figure 5B:
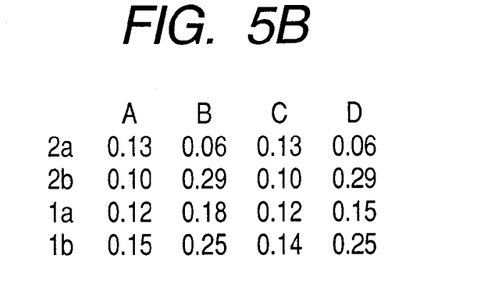
Figure 5C:
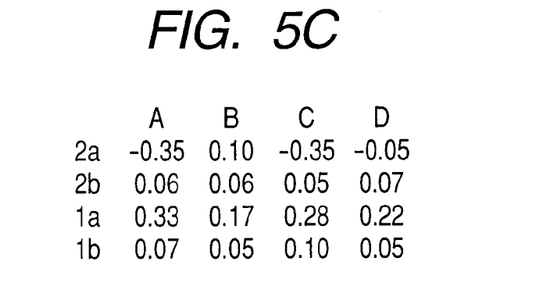
Figure 5D:
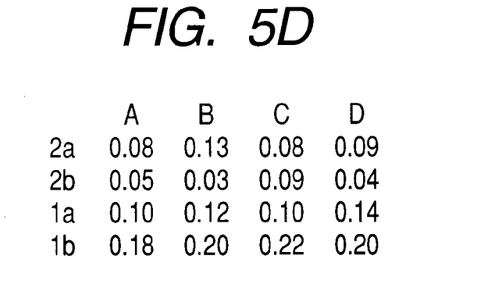

In the cases of FIGS. 5B through 5D, too, it was confirmed that satisfactory results could be achieved with only one cylindrical lens.

Although the deformations of reflective faces were estimated by using four points 15 mm away from the centers of the mirrors A for the X- and Y-components in this embodiment, it is also possible to split the reflective faces into multiple segments in a grid shape and estimate the total deformation from the deformation of each segment.

What is claimed is:

1. A laser machining apparatus comprising:
   an X mirror whose axis of rotation is in an X-direction,
   a Y mirror whose axis of rotation is in a Y-direction,
   a converging lens, wherein a laser being is positioned by the X mirror and the Y mirror and made to enter the converging lens, and
   an optical device arranged on an optical axis of the laser beam for correcting a curvature of a reflective surface of the X mirror or the Y mirror
   and for making converged positions of the laser beam in the X-direction and in the Y-direction coincident with a point on the optical axis,
   wherein a focal distance of the optical device is determined based on a difference between a sum of deformation extents in the X-direction and a sum of deformation extents in the Y-direction, and the deformation extents are relative to respective centers of the X mirror and the Y mirror.

2. The laser machining apparatus according to claim 1, wherein the optical device comprises a cylindrical lens or a cylindrical mirror.

3. The laser machining apparatus according to claim 1, wherein the difference between the sum of the deformation extents in the X-direction and the sum of the deformation extents in the Y-direction is 0.1 μm or more.

* * * * *